(12) United States Patent
Rigler

(10) Patent No.: US 6,516,556 B1
(45) Date of Patent: Feb. 11, 2003

(54) DISPLAY STAND FOR TIED FLIES

(76) Inventor: John Leo Rigler, 4872 W. Village Glen Cir., West Jordan, UT (US) 84084

( * ) Notice: Subject to any disclaimer, the term of this patent is extended or adjusted under 35 U.S.C. 154(b) by 0 days.

(21) Appl. No.: 09/969,284

(22) Filed: Oct. 2, 2001

(51) Int. Cl.[7] .............................................. A01K 97/06
(52) U.S. Cl. .................... 43/57.1; 428/542.4; D11/157; 248/346.03
(58) Field of Search ....................... 43/57.1; 428/542.4; 248/176.1, 346.03, 346.06; 211/14; D11/157; 223/109 R

(56) References Cited

U.S. PATENT DOCUMENTS

| | | | | |
|---|---|---|---|---|
| 890,549 A | * | 6/1908 | Zamel | 43/42.1 |
| 1,742,696 A | * | 1/1930 | Eddy | 223/109 R |
| 2,600,673 A | * | 6/1952 | Murray | 43/41 |
| 3,377,737 A | * | 4/1968 | Campbell | 43/57.1 |
| 4,186,511 A | | 2/1980 | Slacter | 43/57.5 R |
| 4,742,640 A | | 5/1988 | Moore | 43/57.1 |
| 5,365,683 A | * | 11/1994 | Borja | 40/152.1 |
| 5,413,228 A | * | 5/1995 | Le Clerc | 211/14 X |
| 5,983,556 A | | 11/1999 | Zaloga | 43/57.1 |
| 6,079,148 A | | 6/2000 | Yonenoi | 43/57.1 |

* cited by examiner

*Primary Examiner*—Robert P. Swiatek
(74) *Attorney, Agent, or Firm*—Henderson & Sturm LLP

(57) ABSTRACT

A display stand (10) for storing and displaying a plurality of artificial tied flies in a practical and humorous manner wherein the display stand (10) includes: a spherical shaped display member (30) fabricated from Styrofoam (35) and having an exterior surface provided with simulated stitched seams (36) to resemble a baseball; and, a stand member (20) having a shallow curved recess (21) dimensioned to receive the lower portion of the display member (30) and a front face (22) having the legend "Fly Ball" which qualifies as a double entendre.

8 Claims, 1 Drawing Sheet

DISPLAY STAND FOR TIED FLIES

STATEMENT REGARDING FEDERALLY SPONSORED RESEARCH OR DEVELOPMENT

Not applicable.

CROSS REFERENCE TO RELATED APPLICATIONS

Not applicable.

REFERENCE TO MICROFICHE APPENDIX

Not applicable.

BACKGROUND OF THE INVENTION

1. Field of the Invention

The present invention relates to the field of specialized display stands in general and in particular to a stand specifically designed to display tied flies in a unique, practical and humorous manner.

2. Description of Related Art

As can be seen by reference to the following U.S. Pat. Nos. 6,079,148; 5,983,556; 4,186,511; 4,742,640; and, 6,079,148, the prior art is replete with myriad and diverse devices for displaying, transporting and/or storing fishing lures such as tied flies.

While all of the aforementioned prior art constructions are more than adequate for the basic purpose and function for which they have been specifically designed, they are uniformly deficient with respect to their failure to provide a simple, efficient, and practical device for displaying tied fishing flies in a unique and humorous manner.

As most fly fishermen who tie their own flies are all too well aware, there has not been developed to date a display stand for exhibiting their handiwork in a manner that will draw the attention of onlookers to the display stand in a humorous vein that will result in the display stand and flies becoming a topic of conversation and a visual centerpiece.

As a consequence of the foregoing situation, there has existed a longstanding need among tiers of artificial flies for a new and improved stand to display their craftsmanship; and, the provision of such a construction is a stated objective of the present invention.

BRIEF SUMMARY OF THE INVENTION

Briefly stated, the display stand for tied flies that forms the basis of the present invention comprises in general a base unit and a display unit that is removably received by the base unit.

As will be explained in greater detail further on in the specification, the base unit includes a generally flat rectangular base member having a centrally disposed generally shallow curved recess that is dimensioned to receive the lower portion of the display unit.

The display unit in turn comprises a generally spherical display member fabricated from a lightweight hook penetrable material such as Styrofoam or the like wherein the spherical surface can accommodate a large number and variety of tied artificial flies.

In addition, the spherical display member may be provided with simulated stitching to resemble a baseball and the front face of the base member may be angled and further provided with a plate bearing the legend "Fly Ball" to further enhance the humorous, as well as, practical aspects of this invention.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
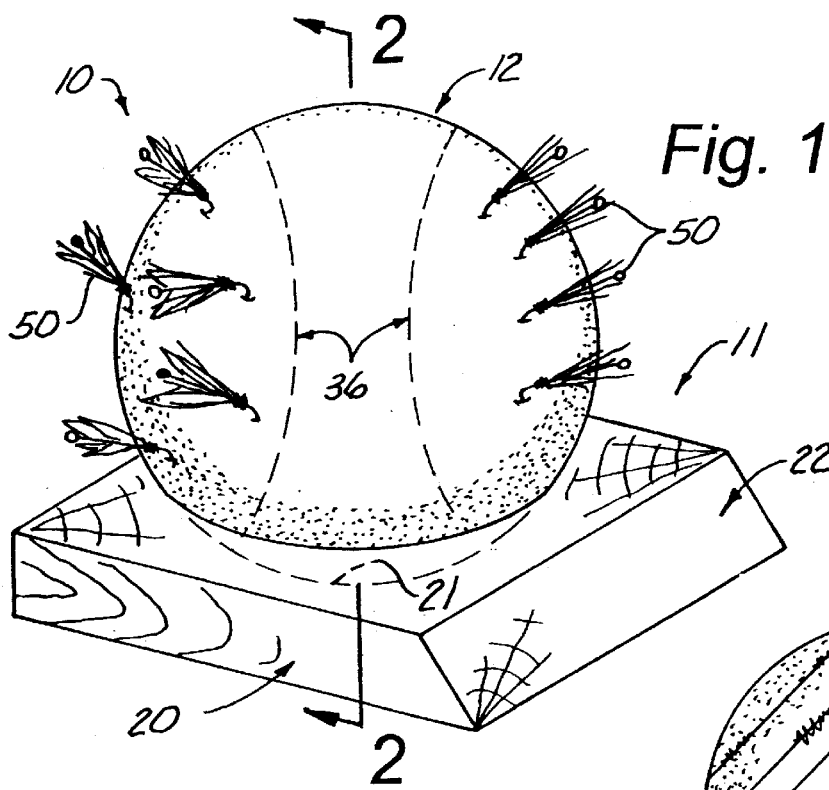
FIG. 1 is a perspective view of the display stand demonstrating tied artificial flies.

As can be seen by reference to the drawings, and in particularly to FIG. 1, the display stand for tied artificial flies that forms the basis of the present invention is designated generally by the reference number 10. The display stand 10 comprises in general a base unit 11 and a display unit 12. These units will now be described in seriatim fashion.

As shown in FIG. 1, the base unit 11 comprises a generally rectangular member 20 having a centrally disposed shallow curved recess 21 formed in the top surface thereof; wherein the front face 22 of the base member 20 may be angled to receive a face plate 23 bearing the legend "Fly Ball" for reasons that will become apparent presently.

Figure 2:
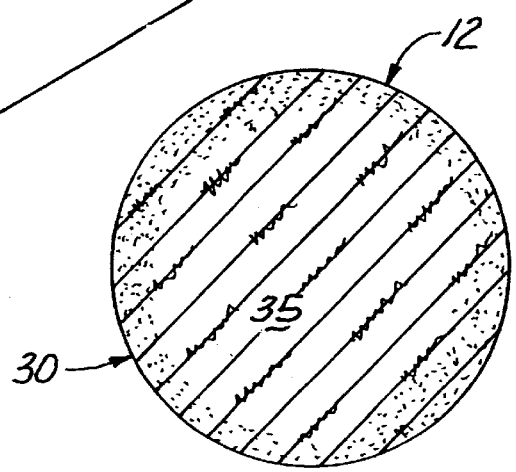
FIG. 2 is a cross-sectional view of the display unit.
Figure 3:
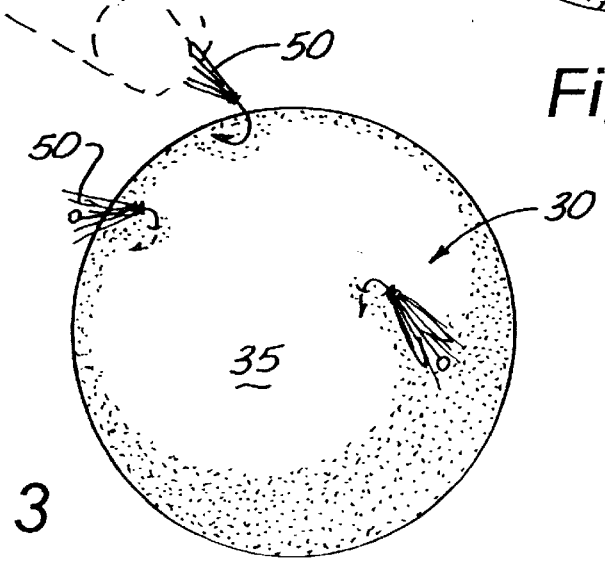
FIG. 3 is an isolated view of the display unit.

Turning now to FIGS. 1 through 3, the display unit 12 comprises a generally spherical display member 30 fabricated from a lightweight hook-penetrable material 35 such as Styrofoam or the like. Furthermore, as shown in FIG. 1, the external surface of the display member 30 may be provided with simulated stitched seams 36 so that the display member 30 resembles a baseball in keeping with the "fly ball" theme.

Obviously, once a number of tied artificial flies 50 are disposed on the exterior surface of the display member 30, the term "fly ball" acquires a double meaning that will naturally attract people to the display stand device 10 both to admire the handiwork of the fly tier, as well as, to engage in animated conversation regarding the double entendre associated with the term "fly ball."

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A display stand in combination with at least two independent tied artificial flies for storing and displaying said at least two tied artificial flies in a humorous manner wherein the display stand comprises:

a display unit including a porous generally spherical display member fabricated from a fish hook-penetrable material; and, a stand unit including a base member having means for supporting the display member in a stable upright orientation.

2. The display stand as in claim 1; wherein, the base member has a generally rectangular configuration with a top surface having a recess dimensioned to receive a portion of the spherical display member.

3. The display stand as in claim 2; wherein, said recess has a shallow curved configuration.

4. The display stand as in claim 2; wherein, the exterior surface of the display member is provided with simulated stitched seams.

5. The display stand as in claim 2; wherein, the base member has a front face provided with the legend "Fly Ball."

6. The display stand as in claim 1; wherein, the exterior surface of the display member is provided with simulated stitched seams.

7. The display stand as in claim 6, wherein, the base member has a front face provided with the legend "Fly Ball."

8. The display stand as in claim 1; wherein, the base member has a front face provided with the legend "Fly Ball."

* * * * *